A. J. VAN ATTA.
Pitmen-Connections.

No. 148,007. Patented Feb. 24, 1874.

WITNESSES,

INVENTOR.
A. J. Van Atta
BY
ATTORNEYS.

UNITED STATES PATENT OFFICE.

ANDREW J. VAN ATTA, OF VAN ATTA, ASSIGNOR OF ONE-HALF HIS RIGHT TO GEORGE VAN ATTA, OF NEWARK, OHIO.

IMPROVEMENT IN PITMAN-CONNECTIONS.

Specification forming part of Letters Patent No. 148,007, dated February 24, 1874; application filed October 18, 1873.

*To all whom it may concern:*

Figure 1:
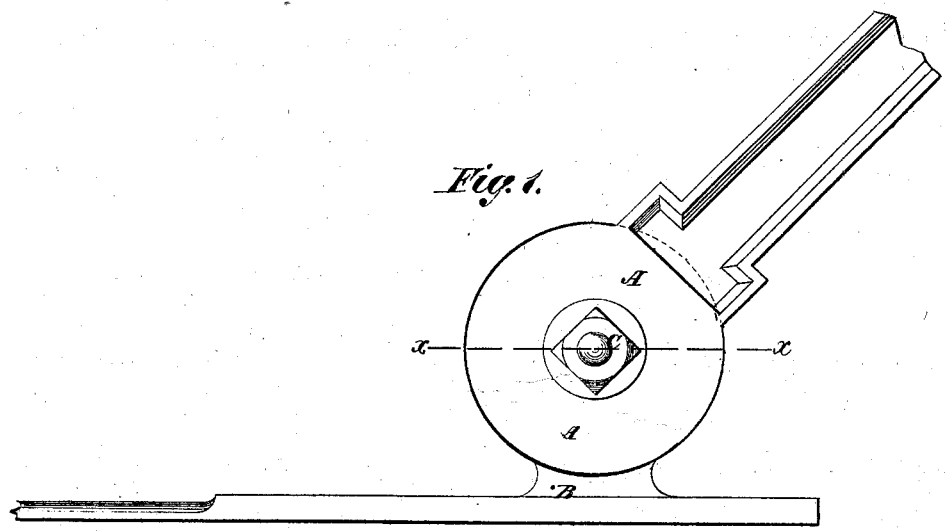
Figure 2:
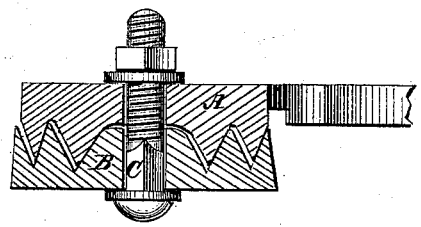
Figure 3:
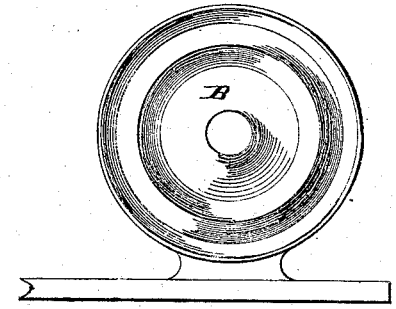
Figure 4:
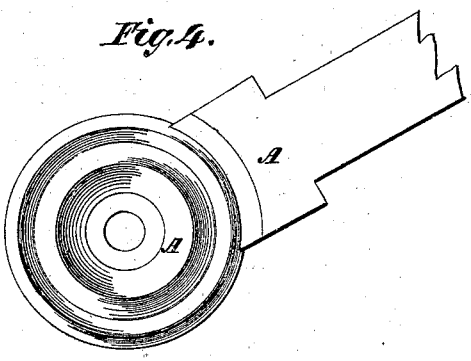

Be it known that I, ANDREW J. VAN ATTA, of Van Atta, in the county of Licking and State of Ohio, have invented a new and useful Improvement in Pitman-Connection, of which the following is a specification:

Figure 1 is a side view of my improved pitman-connection. Fig. 2 is a detail section of the same, taken through the line $x\ x$, Fig. 1. Fig. 3 is a detail view of the inner side of one part of the connection. Fig. 4 is a detail view of the inner side of the other part of the connection.

Similar letters of reference indicate corresponding parts.

My invention has for its object to furnish an improved pitman-connection which shall be so constructed as to throw the force of the stroke to one side or outward instead of direct, and to enable lost motion and wear to be taken up, and which shall be simple in construction, convenient in use, and effective and reliable in operation; and it consists in a pitman-connection provided with one or more concentric V-shaped ring corrugations upon its adjacent surfaces, and in the combination of the two parts of the connection, provided with one or more concentric V-shaped ring projections upon their adjacent surfaces, and the connecting-bolt with each other, as hereinafter more fully described.

A and B are the two parts of the connection. The part A is designed to be connected with the end of the pitman, and the part B with the sickle-bar or other object to be moved. The parts A B have one or more concentric V-shaped ring corrugations formed upon them, fitting into each other, as shown in Fig. 2, but so formed that the points of the corrugations of the one part cannot reach the bottoms or bases of the corrugations of the other part. The parts A B are secured to each other by a bolt, C, which passes through the center of the said parts A B, and is secured by a nut and washer, as shown in Figs. 1 and 2.

By this construction the force of the stroke will be received upon the corrugations of the connection, and will be thrown to one side instead of being direct.

As the parts wear, the wear may be taken up by tightening the bolt C, so that the connection can be kept always tight, taking up the lost motion.

Having thus described my invention, I claim as new and desire to secure by Letters Patent—

The combination of pitman, having the disk A, and a sickle-bar, having the disk B, held together by bolt and nut, and having opposite concentric tongues and grooves whose bisections are not in the same circles, as and for the purpose described.

ANDREW J. VAN ATTA.

Witnesses:
 JAMES Z. ALMOND,
 ARTHUR P. HOFFMAN.